United States Patent
Poon et al.

(10) Patent No.: US 7,571,256 B2
(45) Date of Patent: Aug. 4, 2009

(54) DATA COMMUNICATION EXECUTION THREAD

(75) Inventors: Kacheong Poon, Milpitas, CA (US); Cahya Adi Masputra, Millbrae, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1365 days.

(21) Appl. No.: 10/254,174

(22) Filed: Sep. 24, 2002

(65) Prior Publication Data
US 2004/0057418 A1    Mar. 25, 2004

(51) Int. Cl.
G06F 15/16 (2006.01)
G06F 3/00 (2006.01)
G06F 11/00 (2006.01)
H04L 12/56 (2006.01)

(52) U.S. Cl. .................. 709/250; 709/232; 710/20; 370/229; 370/469

(58) Field of Classification Search .................. None
See application file for complete search history.

(56) References Cited

U.S. PATENT DOCUMENTS

| | | | | |
|---|---|---|---|---|
| 5,524,250 A | * | 6/1996 | Chesson et al. | 712/228 |
| 6,226,686 B1 | * | 5/2001 | Rothschild et al. | 709/245 |
| 6,338,078 B1 | * | 1/2002 | Chang et al. | 718/102 |
| 6,614,808 B1 | * | 9/2003 | Gopalakrishna | 370/469 |
| 6,631,422 B1 | * | 10/2003 | Althaus et al. | 709/250 |
| 6,836,808 B2 | * | 12/2004 | Bunce et al. | 710/20 |
| 2002/0083297 A1 | * | 6/2002 | Modelski et al. | 712/18 |

* cited by examiner

Primary Examiner—Wen-Tai Lin
(74) Attorney, Agent, or Firm—Martine Penilla & Gencarella, LLP (57) ABSTRACT

Embodiments of the present invention provide for reliable receipt of data packets by a network device. The present invention also provides a receive thread for receiving data packets. The present invention also provides a drainer thread for processing packets according to an applicable protocol. As a result, the network device is capable of receiving and processing data packets at an increased rate.

4 Claims, 6 Drawing Sheets

DATA COMMUNICATION EXECUTION THREAD

FIELD OF THE INVENTION

Embodiments of the present invention relate to communication across a network, and more particularly to execution thread handling for receiving data packets.

BACKGROUND OF THE INVENTION

In the conventional art, network devices (e.g. computers, workstations, servers, or the like) are generally comprised of hardware, an operating system, and one or more user programs (hereinafter referred to as applications). The hardware (e.g. processor, memory, input/output devices, etc.) provides the basic computing resources. The applications (e.g. database systems, text editors, games, and the like) provide users with various functions. The operating system generally controls and coordinates the use of the hardware among the various applications.

The Unix operating system (Unix) is one example of an operating system that is currently used by many enterprise computer systems. Unix consists of two separable parts, which include the kernel space and user space. The user space typically provides an operating environment for executing system libraries, compilers, interpreters, shells and other such modules, which provide useful functions to the user. The kernel space provides an operating environment for central control processes such as file-system access, communication protocols, and other system facilities.

The kernel space typically includes one or more network communication protocols, such as the TCP/IP suite. The TCP/IP protocol suite is typically divided into three layers: transport layer, internet layer, and network access layer. The transport layer (TCP) provides a flow control protocol. The flow control protocol keeps track of data packets to assure reliable delivery to an appropriate application. It includes explicit and acknowledged connection initiation and termination, reliable in-order unduplicated delivery of data, and out of band indication of urgent data. The internet layer (IP) provides an addressing and routing protocol. The addressing and routing protocol includes host-to-host addressing and routing of data packets, data packet fragmentation, and re-assembly. The network access layer provides a driver protocol, such as data link provider interface (DLPI), or the like. The driver protocol provides access to and transmission of data across a communication channel (physical layer).

Figure 1:
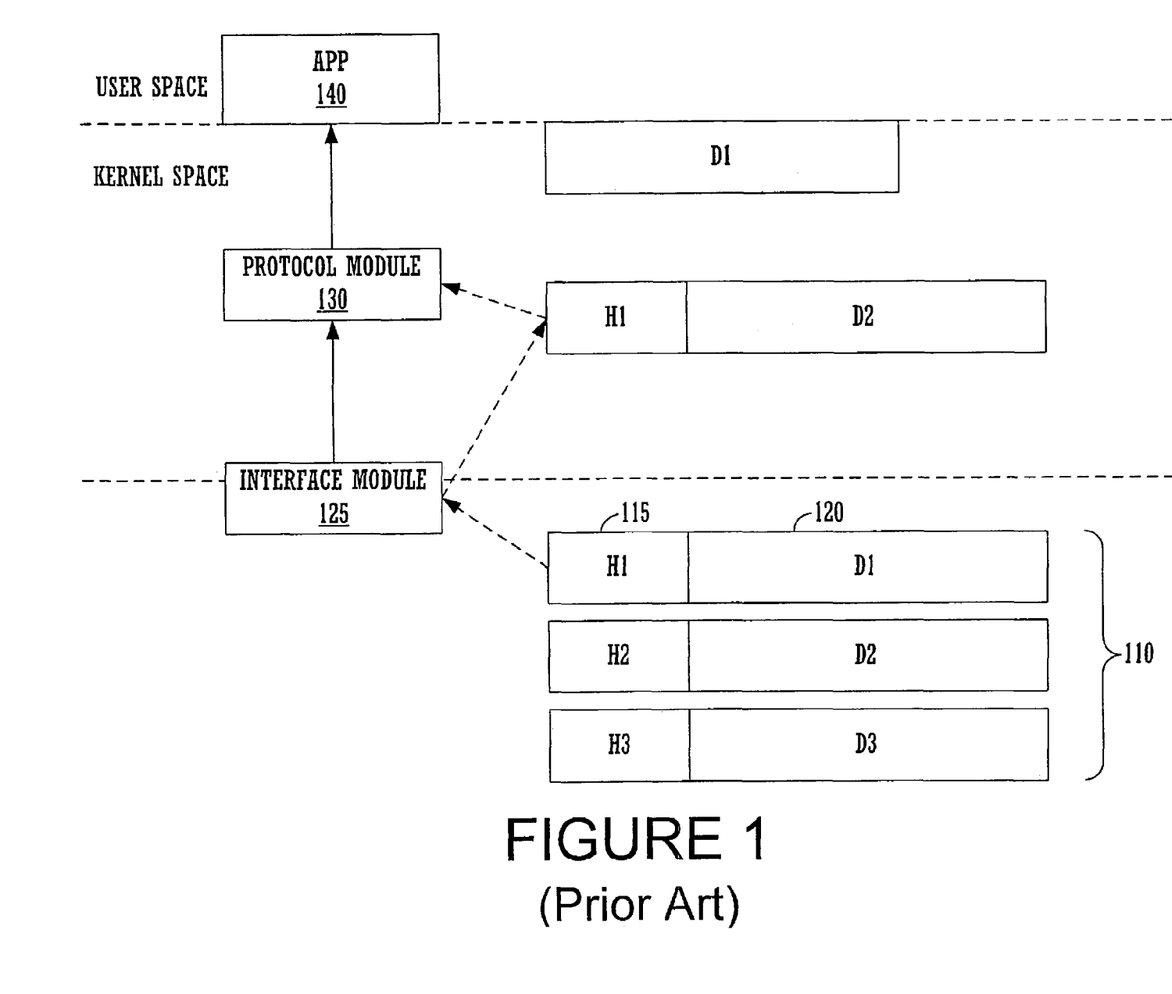
FIG. 1 shows a diagram of a network communication receive stream in accordance with the conventional art.

Referring to FIG. 1, a diagram of a network communication receive stream in accordance with the conventional art is shown. As depicted in FIG. 1, one or more data packets 110 are communicated across a communication channel. Each data packet is comprised of a header 115 and a payload 120. An interface module 125 acquires the data packets 110 and stores them in a buffer. The interface module 125 generates an interrupt upon acquiring a data packet. The interrupt initiates a thread of execution. The thread of execution represents the code stack comprising the applicable protocol suite (e.g. DLPI, IP protocol, TCP protocol, and/or the like). The interrupt therefore causes a protocol module 130 to receive the data packet and provide for routing and flow control. The thread then provides the payload 120 contents of the data packet 110 to a destination application 140.

According to the conventional art, the thread of execution spans from the interface module 125 to the application 140. The long thread provides the payload to the application 140 as quickly as possible. Thus, according to the conventional art, the long thread provides for short data latency when receiving data packets.

However, while the thread is being executed, the protocol module 130 cannot service another data packet. Therefore, the interface module 125 buffers other incoming data packets until the protocol module 130 can service another data packet. However, the interface module 125 has a finite buffer for holding data packets. Therefore, if the data packets are received faster then the protocol module 130 can process them, the interface module 125 will drop data packets once its buffer is full.

Thus, the network communication protocol is prone to scalability issues when the interface module 125 speed exceeds the processor speed of the network device. This is because the receive processing is done from a single thread of execution and does not take into account application related issues, such as flow control or the like.

SUMMARY OF THE INVENTION

Thus, there is a continued need for a network communication method capable of providing for increased network throughput. The network communication method should also provide for increased processing of data packets by a network interface card (NIC). The network communication method should also provide for efficient processor utilization.

Embodiments of the present invention provide for reliable receipt of data packets by a network device. Embodiments of the present invention also provide a receive thread for receiving data packets. Embodiments of the present invention also provide a drainer thread for processing packets according to an applicable protocol. Thus, embodiments of the present invention provide for receipt of additional packets by the receive thread, while the drainer thread is processing the current data packet. Thus, embodiments of the present invention advantageously increase processing of data packets by the NIC.

Accordingly, embodiments of the present invention avoid fundamental changes to the stream's framework for processing data packets, and minimize potential impact on network device stability and performance. Embodiments of the present invention also provide a flexible and protocol-independent method for receiving data packets.

Embodiments of the present invention only require minimal and localized changes throughout the kernel. Embodiments of the present invention, furthermore, maintain compliance with current networking standards. Embodiments of the present invention are backward compatible with device drivers and other protocols or technologies (e.g. IPsec, IPQoS, CGTP, and the like). Furthermore, applications benefit from the increase in network throughput and reduced processor utilization provided by embodiments of the present invention, which off-sets increased data latency resulting from the handoff between the receive thread and the drainer thread.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Figure 2:
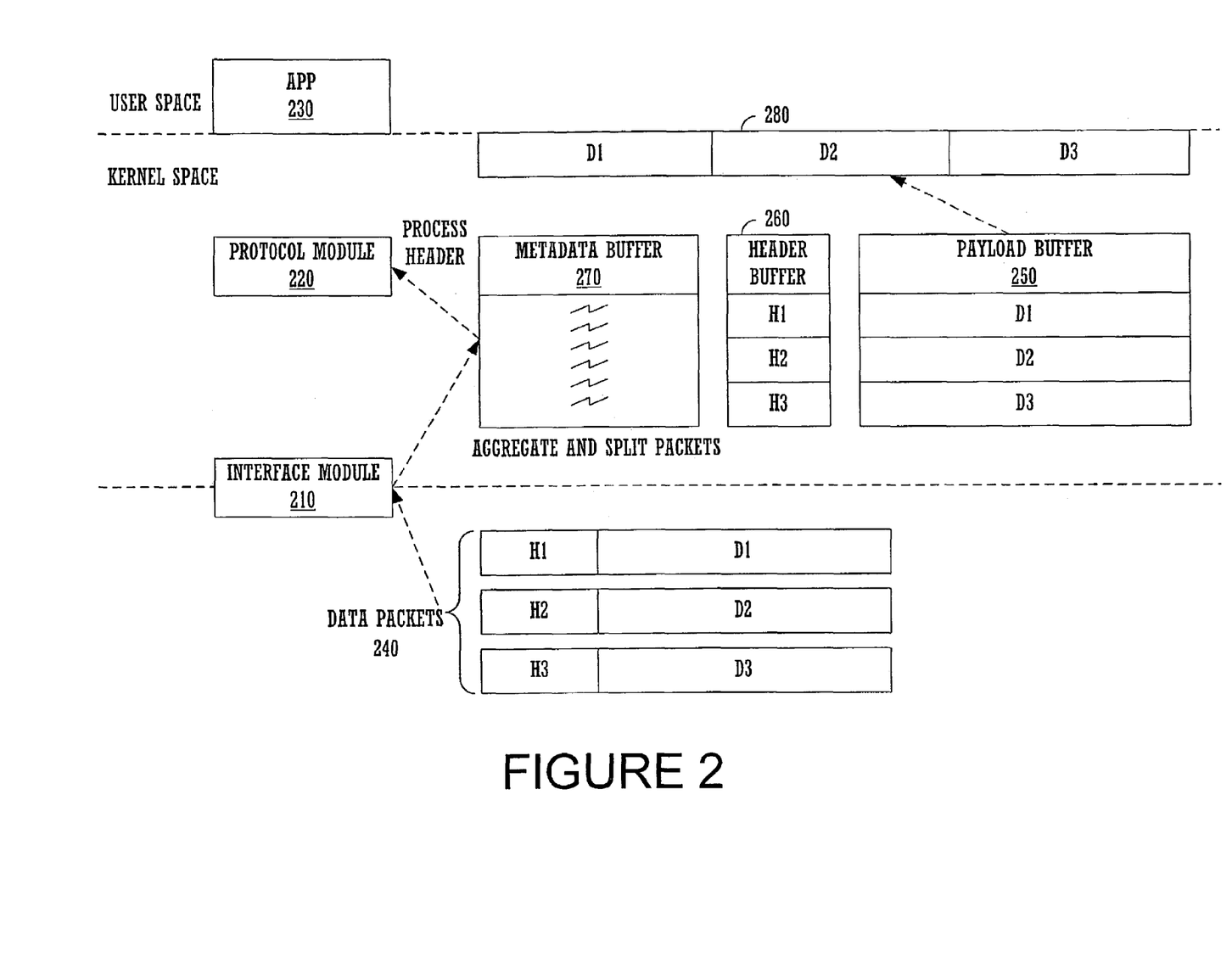
FIG. 2 shows a diagram of a network communication receive stream providing for multi-data receiving of data packets.

Referring now to FIG. 2, a diagram of a network communication receive stream in accordance with Inventors' co-filed United States Patent Application entitled "Multi-Data Receive Processing According to a Data Communication Protocol" is shown. To the extent not repeated herein, the contents of "Multi-Data Receive Processing According to a Data Communication Protocol", filed Sep. 24, 2002, now U.S. Pat. No. 7,269,171, are incorporated herein by reference. As depicted in FIG. 2, the receive stream comprises an interface module 10 communicatively coupled to a protocol module 220. The protocol module 220 is also communicatively coupled to an application 230.

When the interface module 210 acquires data packets 240 it generates an interrupt. The operating system catches the interrupt and spins off a thread to handle the interrupt. The thread represents a code stack comprising the applicable protocol suite (e.g. DLPI, IP protocol, TCP protocol, and/or the like).

The protocol module 220 provides for receipt of data packets 240 transmitted across a network. The protocol module 220 also implements multi-data receipt, which permits multiple data packets destined for the same application to be aggregated. The protocol module 220 waits for a predefined condition, when collecting multiple data packets 240 for the same application. The predefined condition is selected so as to optimize performance of the network communication receive stream.

In one configuration, the predefined condition may be a specified maximum number of packets. In an exemplary configuration, the maximum number of packets is selected from a range of 2-10 packets. In another configuration, the predefined condition may be an interval of time chosen such that the sending network device does not re-send the data packet because an acknowledgement has not been received. In another configuration, the predefined condition may be an interval of time chosen such that latency is not unduly increased. Furthermore, if a data packet is received for another destination, the aggregation of the previous data packets may be terminated.

When multiple data packets 240 for the same application are received, the protocol module 220 also implements header/payload splitting. Splitting data packets causes the payload of each packet to be loaded into a payload buffer 250, the header of each packet to be loaded into a header buffer 260, and information about the aggregation and splitting to be loaded into a metadata buffer 270. The metadata buffer 270 may contain information such as a pointer to the start of the header buffer and payload buffer, the number of packet elements, the location and length of each packet element, and the like, for the aggregated data packets 240.

In one implementation, the protocol module 220 loads the header and payload into the respective buffers 250, 260 in the order that the data packets are received. In another implementation, the protocol module 220 reorders the data packets according to the sequence number in the header of each packet, before loading the header and payload into the respective buffers 250, 260. The protocol module 220 also provides routing and flow control functions, utilizing the aggregated header buffer 260 and metadata buffer 270.

In one implementation, the protocol module 220 then passes a payload pointer to the destination application 230. When the protocol module 220 reorders the data packets according to the sequence number in the header of each packet, the payload buffer 250 logically represents a contiguous payload. In another implementation, the protocol module 220 copies the payloads from the payload buffer 250 into an application buffer 280, according to the sequence number in the corresponding header. The application buffer 280 therefore contains a contiguous payload.

Figure 3:
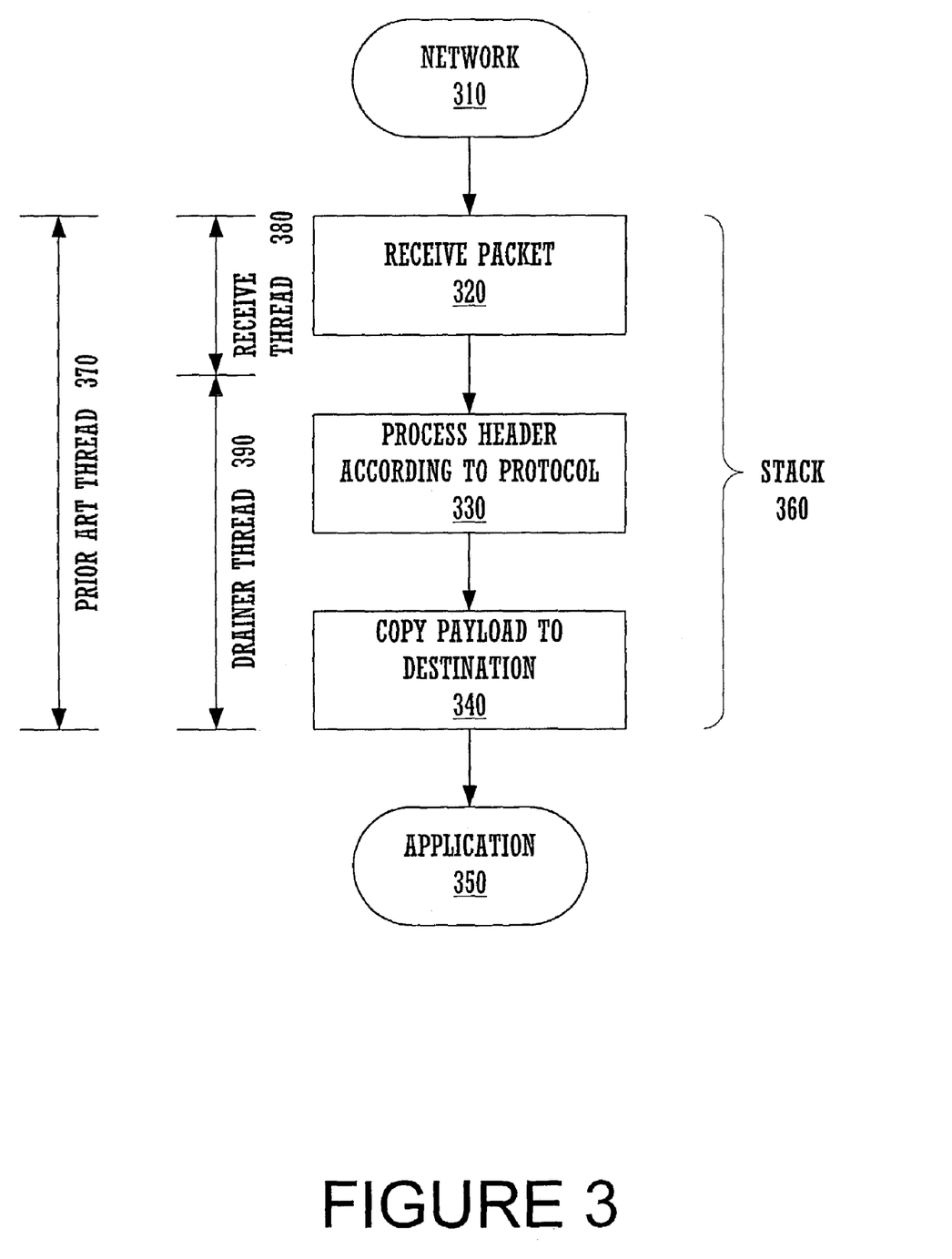
FIG. 3 shows a flow diagram of a receive process in accordance with one embodiment of the present invention.

Referring now to FIG. 3, a flow diagram of a receive process in accordance with one embodiment of the present invention is shown. As depicted in FIG. 3, the process begins with receipt of a data packet from a network, at step 320. The header of the data packet is then processed in accordance with an applicable protocol, at step 330. The payload of each data packet is then copied to the destination application, at step 340.

In one embodiment of the present invention, the process of receiving packets 320 is provided for by a receive thread 380 of execution. Processing the data packet header according to the applicable protocol 330, and copying the data packet payload to the destination application 340 are provided for by a drainer thread 390 of execution. The multiple threads result in increased data latency because of the handing-off between the receive thread 380 and the drainer thread 390. However, the process for receiving packets 320 can be executed again, while the drainer thread 390 is handling the current data packet. Therefore, increased overall system performance can be obtained by trading increased data latency for faster receive processing of incoming data packets.

According to the prior art method, the processes of receiving packets 320, processing the data packet header according to the applicable protocol 330, and copying the data packet payload to the destination application 340, are provided for by a single prior art thread 370 of execution. The single prior art thread 370 provides for reduced data latency as compared with the present invention. However, when data packets are being received faster than the single prior art thread 370 can be completed, subsequent packets will be dropped if insufficient buffer space is available. Dropping packets reduces network throughput, which nullifies any reduced data latency provided by the single prior art thread 370.

Figure 4:
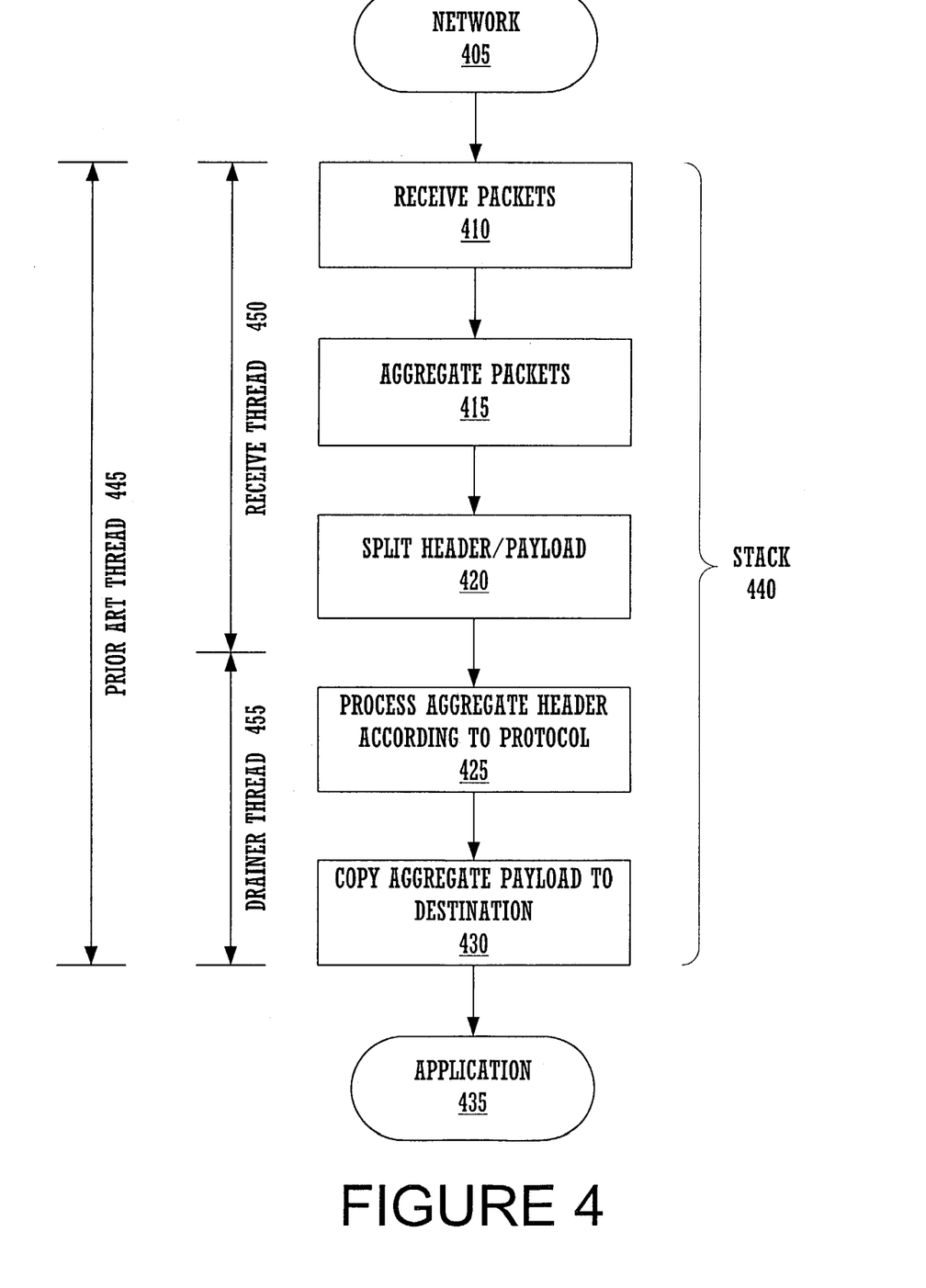
FIG. 4 shows a flow diagram of a multi-data receive process in accordance with one embodiment of the present invention.

Referring now to FIG. 4, a flow diagram of a multi-data receive process in accordance with one embodiment of the present invention is shown. As depicted in FIG. 4, the process begins with receipt of one or more data packets from a network, at step 410. Data packets being sent to the same destination are aggregated, at step 415. The header and payload of each data packet are split, at step 420. The aggregated headers are then processed in accordance with the applicable protocol, at step 425. Finally, the aggregated payloads are copied to the destination application, at step 430.

In one embodiment of the present invention, the processes of receiving packets 460, aggregating packets 415, and header/payload splitting 420, are provided for by a receive thread 450 of execution. Processing the data packet headers according to the applicable protocol 425, and copying the data packet payloads to the destination application 430, is provided for by a drainer thread 455 of execution. The multiple threads result in increase data latency because of the handing off between the receive thread 450 and the drainer thread 455. However, the process for receiving packets 410, aggregating packets 415, and header/payload splitting 420, can be executed again, while the drainer thread 450 is handling the current aggregated packets. Therefore, increased overall system performance can be obtained by trading increased data latency for faster receive processing of incoming data packets.

According to the prior art method, the processes of receiving packets 410, aggregating packets 415, and header/payload splitting 420, processing the data packet headers according to the applicable protocol 425, and copying the data packet payloads to the destination application 430, are provided for by a single prior art thread 445 of execution. The single prior art thread 445 provides for reduced data latency as compared with the present invention. However, when data packets are being received faster than the single prior art thread 445 can be completed, subsequent packets will be dropped if insufficient buffer space is available. Dropping packets reduces network throughput, which nullifies any reduced data latency provided by the single prior art thread 445.

Figure 5:
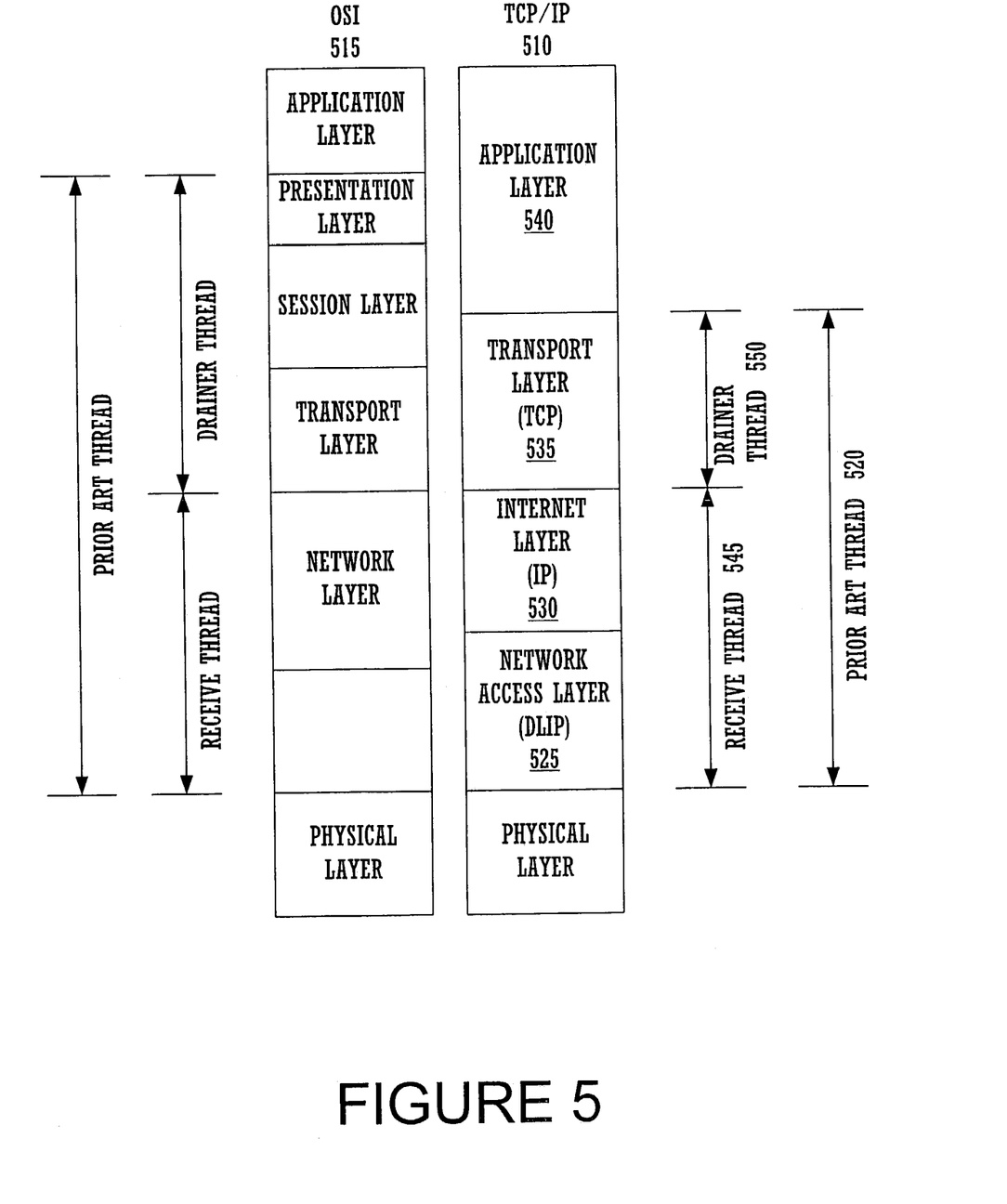
FIG. 5 shows a block diagram of various protocol architectures for implementing embodiments of the present invention.

Referring now to FIG. 5, a block diagram of various protocol architectures for implementing embodiments of the present invention is shown. As depicted in FIG. 5, an embodiment of the present invention may be realized using a TCP/IP 510, Open System Interconnect (OSI) 515, or like architecture.

According to the conventional art, a single thread 520 of execution is provided for implementing a network access layer 525, an internet layer 530, and a transport layer 535 of the TCP/IP 510 protocol suite. The single thread 520 of execution provides for minimal data latency compared with the present invention. However, additional data packets cannot be received by the network access layer 525 while the current data packet is being processed by the prior art thread 520 of execution.

In one embodiment of the present invention, a receive thread 545 of execution is provided for implementing the network access layer 525 and the internet layer 530. A drainer thread 550 is provided for implementing the transport layer 535. The receive thread 545 provides for receipt of an additional data packet, while the drainer thread 550 is processing the current packet. Thus, the network access layer 525 can advantageously process additional packets. The increased packet handling capacity of the network access layer 525 reduces the chance that data packets will be dropped. The increased packet handling capacity also increases throughput in very fast communication networks, which off-sets the data latency resulting from the multiple threads 545, 550.

Those skilled in the art will appreciate that the present invention can be realized using any number of other protocol architectures.

Figure 6:
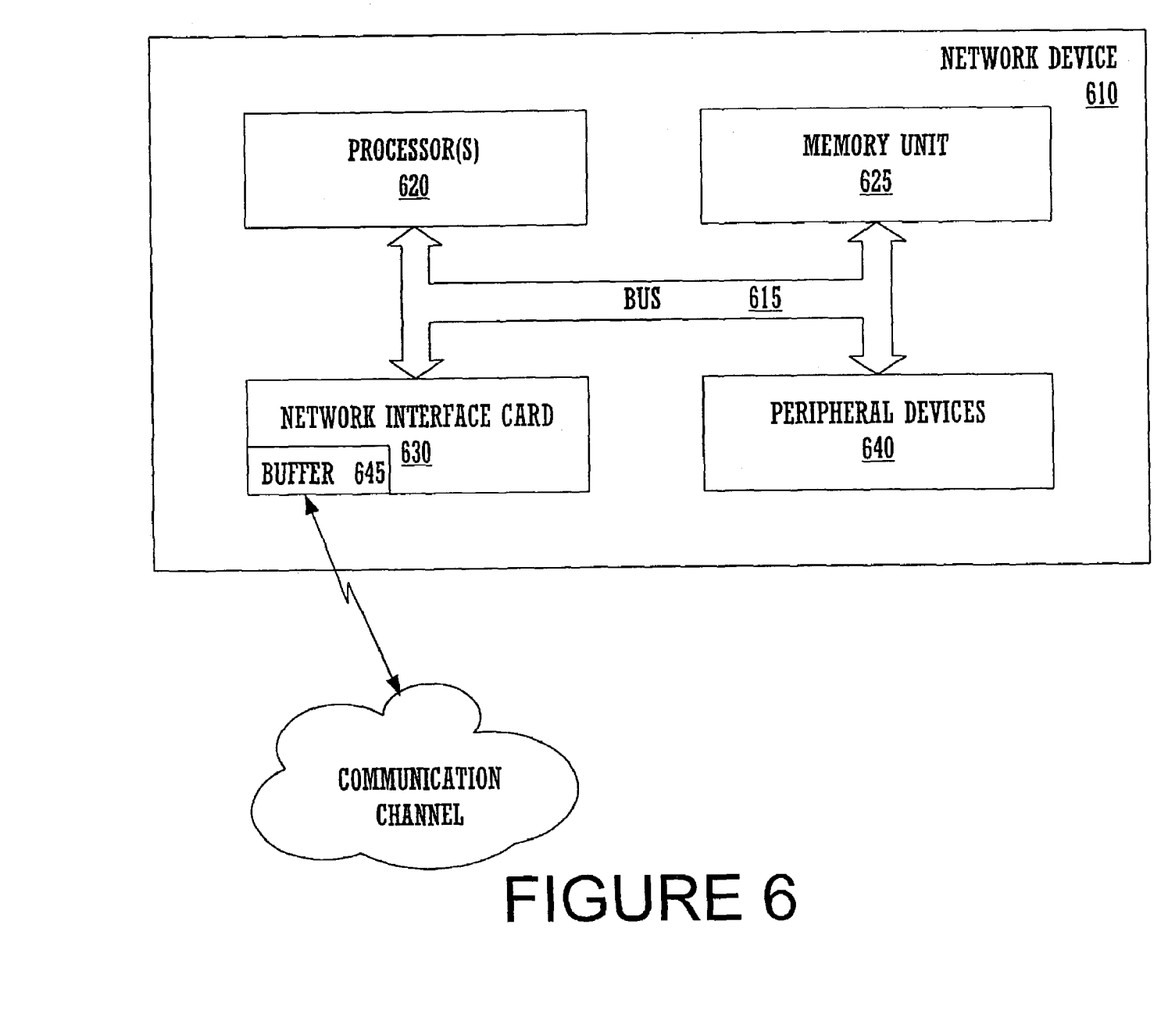
FIG. 6 shows a block diagram of a network device in accordance with one embodiment of the present invention.

Referring now to FIG. 6, a block diagram of a network device 610 in accordance with one embodiment of the present invention is shown. As depicted in FIG. 6, the network device 610 comprises an address/data bus 615 for communicating information and instructions. One or more processors 620 are coupled with the bus 615 for processing information and instructions. A memory unit 625 is also coupled to the bus 615 for storing information and instructions for the processor(s) 620. The memory unit 625 may include volatile memory (e.g. random access memory, static RAM, dynamic RAM, and the like), non-volatile memory (e.g. read only memory, programmable ROM, flash memory, EPROM, EEPROM, and the like), mass data storage (e.g. hard disk, optical disk, floppy disk, and the like), and the like. The network device 610 also includes a network interface card (NIC) 630 coupled with the bus 615. The NIC 630 provides for communicating with other network devices across a communication channel 635. The NIC 630 conforms to a Data Link Provider Interface (DLPI), or like standard. Optionally, the network device 610 may include peripheral devices 640 (e.g. display, keyboard, pointing device, speaker, and the like).

Certain processes and steps of the present invention are realized as a series of instructions (e.g. code) that reside within the memory unit 625 and are executed by the processor(s) 620. When executed, the instructions cause the processor(s) 620 to provide an operating system.

Furthermore, one or more applications may be executing on the network device 610 and controlled by the operating system. For each application, there may be an instance of a TCP, UDP or like protocol (hereinafter referred to as just TCP). The TCP protocol is also provided by the processor(s) 620 operating on instructions and information contained in the memory unit 625. The TCP protocol provides for flow control of data packets.

For each instance of the TCP protocol, there is an instance of an IP protocol, or like protocol. The IP protocol is also provided by the processor(s) 620 operating on instructions and information contained in the memory unit 625. The IP protocol provides for addressing and routing of data packets.

For all the instances of the IP protocols, there is a DLPI instance of the protocol stack. The DLPI protocol is provided by firmware in the NIC 630, and/or the processor(s) 620 operating on instructions and information contained in the memory unit 625. The DLPI protocol provides for receipt of data packets from the communication channel 635. Incoming data packets are buffered 645 by the NIC 630, for receive processing by the DLPI.

When an incoming data packet is buffered 645 by the MC 630, an interrupt is sent to the processor(s) 620. The operating system therefore allocates and dispatches a receive thread to provide the receive function of the DLPI and the routing function of the IP protocol.

Upon completion of the receive thread of execution, the receive thread hands off to a drainer thread of execution. The drainer thread provides for the flow control function of the TCP protocol.

As the current drainer thread is being executed, a new receive thread can handle receipt of another data packet. Therefore, increased data packet handling by the DLPI can be realized. The increased data handling capacity of the NIC 630 therefore reduces the chance that data packets will be dropped because the NIC 630 buffer 645 is full.

In an additional feature of the present invention, the processor(s) 620 is capable of dynamically allocating and dispatching the drainer thread of execution based upon the behavior of an application. The processor(s)' 620 ability to allocate, determine, and dispatch the drainer thread extends scalability of the communication network, when the speed of the NIC 630 exceeds the speed of the processor(s) 620.

Thus, an embodiment of the present invention provide for increased network throughput in very fast networks, which off-sets the increased data latency resulting from the multiple threads of execution. Furthermore, current applications benefit from the increase in network throughput and reduced processor untilization provided by embodiments of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A network communication method for receiving multiple data packets in the form of a current sequence of separate data packets transmitted across a network, each of the data packets of the current sequence being destined for a same application and comprising a header and a data payload, the method for receiving comprising the operations of:
   a) defining a TCP/IP protocol suite consisting of a network access layer, an internet layer, and a transport layer;
   b) providing a receive thread of execution for implementing only the network access layer and the internet layer;
   c) providing a drainer thread separate from the receive thread for implementing only the transport layer;
   d) executing the receive thread for receiving the multiple data packets in the form of the current sequence of separate data packets destined for the same application, the executing of the receive thread comprising performing the operations of:
      (i) receiving the multiple data packets in the form of the current sequence of separate data packets;
      (ii) aggregating the separate data packets of the current sequence;
      (iii) splitting each data packets of the current sequence to load the header of each packet into a header buffer and to load the data payload of each packet into a payload buffer;
      (iv) copying the data payload of each packet from the payload buffer into an application buffer corresponding to the same application to which the sequence of separate data packets is destined; and
   e) executing the drainer thread to process the split data packet headers and to copy the data payload of each split data packet to the same destination application.

2. The method recited in claim 1, wherein the operation of aggregating the separate data packets in executing the receive thread comprises terminating the aggregating operation upon the occurrence of any of the following events:
   reaching a maximum number of aggregated data packets destined for the same application; or
   expiration of a maximum interval of time during which the current sequence has been received; or
   receiving a subsequent data packet destined for an application that is different from said same application.

3. The method recited in claim 1, wherein the operation of executing the receive thread further comprises handing-off the receiving thread to the drainer thread for execution of the drainer thread.

4. A network communication method for receiving multiple data packets in the form of sequences of separate data packets, each of the separate data packets of a first sequence being destined for a first same application, each of the separate data packets of a second sequence being destined for a second same application, each of the separate data packets comprising a header and a data payload, the method for receiving comprising the operations of:
   a) defining a TCP/IP protocol suite consisting of a network access layer, an internet layer, and a transport layer, the transport layer being configured to copy data packet payloads to a selected one of the first and second same applications;
   b) providing a receive thread of execution for implementing only the network access layer and the internet layer;
   c) providing a drainer thread separate from the receive thread for implementing only the transport layer;
   d) executing the receive thread for receiving the first sequence of separate data packets destined for the same first application, the executing of the receive thread comprising performing the operations of:
      (i) receiving the multiple data packets in the form of the first sequence of separate data packets;
      (ii) aggregating the separate data packets of the first sequence; and
      (iii) splitting the aggregated data packets of the first sequence to load the header of each packet into a header buffer and to load the data payload of each packet into a payload buffer;
      (iv) copying the data payload of each packet from the payload buffer into an application buffer corresponding to the first same application to which the first sequence of separate data packets is destined; and
      (v) handing-off the receiving thread to the drainer thread to enable executing the receiving thread again for receiving the second sequence of separate data packets destined for the second same application;
   e) executing the drainer thread to process the split data packet headers of the first sequence and to copy the data payload of each split data packet to the first same application; and
   f) while the drainer thread is executing, executing the receive thread again to receive the second sequence of data packets, and then again executing the drainer thread to process the split data packet headers of the second sequence and to copy the data payload of each split data packet of the second sequence to the second same application.

* * * * *